US007848710B2

United States Patent
Rofougaran

(10) Patent No.: US 7,848,710 B2
(45) Date of Patent: Dec. 7, 2010

(54) RADIO HAVING ADJUSTABLE RESONANT CIRCUITS

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 636 days.

(21) Appl. No.: 11/847,994

(22) Filed: Aug. 30, 2007

(65) Prior Publication Data

US 2009/0061790 A1 Mar. 5, 2009

(51) Int. Cl.
*H04B 1/40* (2006.01)
(52) U.S. Cl. .................. 455/75; 455/77; 455/87; 455/178.1; 455/191.1
(58) Field of Classification Search .......... 455/75, 455/77, 87, 178.1, 191.1, 193.2, 209, 213, 455/306, 307, 326
See application file for complete search history.

(56) References Cited

U.S. PATENT DOCUMENTS

2007/0126937 A1 * 6/2007 Utsunomiya et al. ........ 348/731
2008/0146146 A1 * 6/2008 Binder et al. ................. 455/20

* cited by examiner

Primary Examiner—Tuan A Pham
(74) Attorney, Agent, or Firm—Garlick Harrison & Markison; Bruce E. Garlick

(57) ABSTRACT

A radio circuit includes a mixing module, a first adjustable resonant circuit and a second adjustable resonant circuit. The mixing module is coupled to mix a first signal having a first carrier frequency with a second signal having a second carrier frequency to produce a mixed signal having a frequency sum component and a frequency difference component. The first adjustable resonant circuit is tuned to resonant at a frequency corresponding to one of the frequency sum component and the frequency difference component. The second adjustable resonant circuit is tuned to resonant at a frequency corresponding to another one of the frequency sum component and the frequency difference component, wherein the first and second adjustable resonant circuits alter the mixed signal to produce a converted signal.

12 Claims, 12 Drawing Sheets

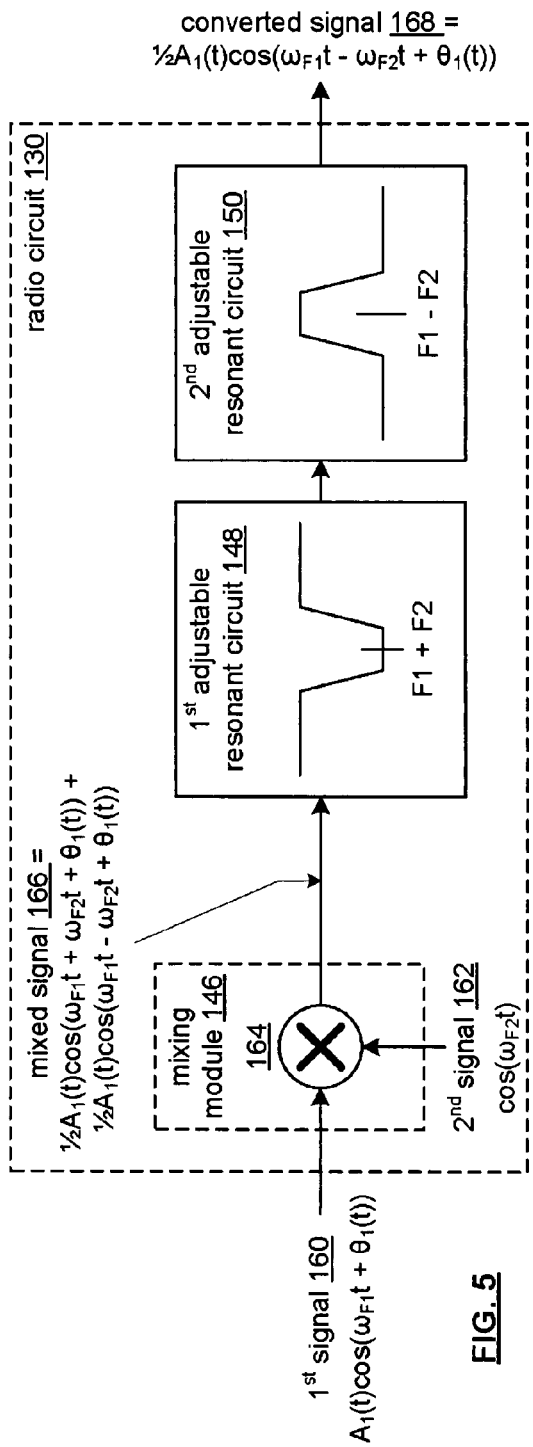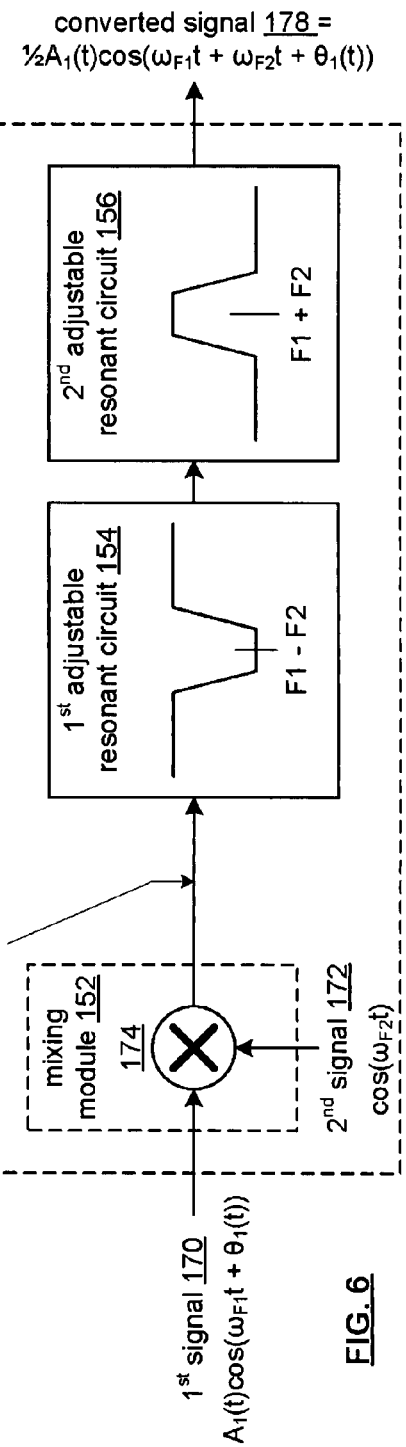
FIG. 5
FIG. 6

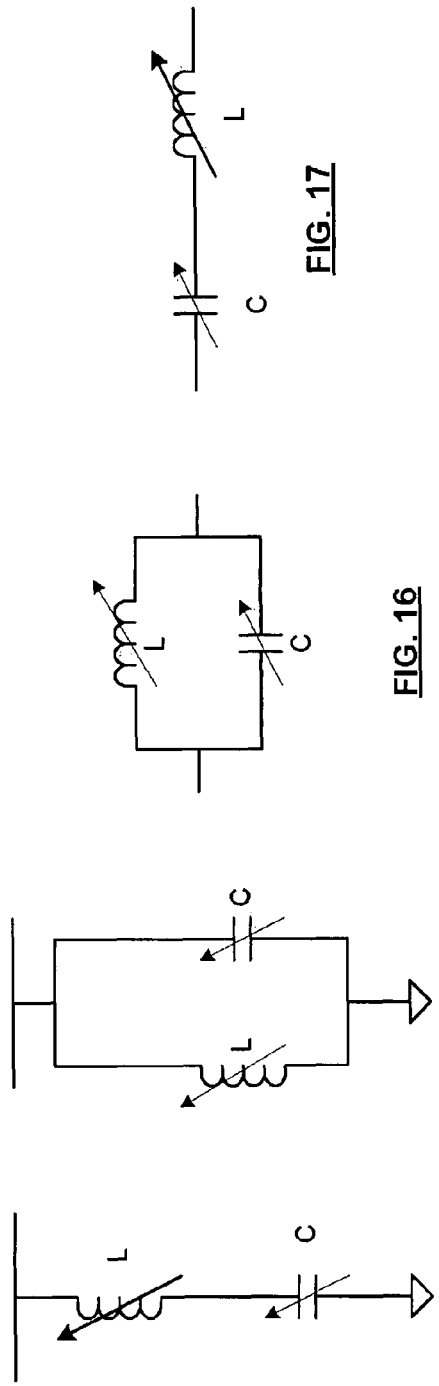
FIG. 17
FIG. 16
FIG. 15
FIG. 14
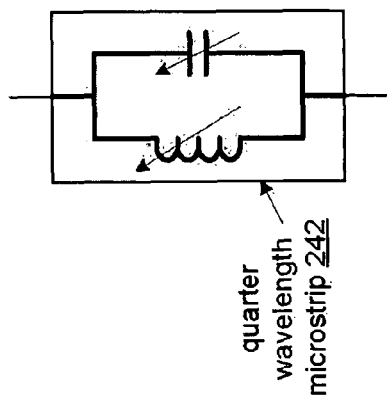
FIG. 19
quarter wavelength microstrip 242
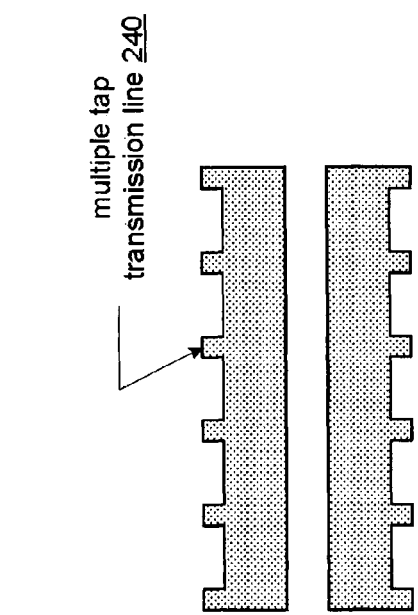
FIG. 18
multiple tap transmission line 240

US 7,848,710 B2

RADIO HAVING ADJUSTABLE RESONANT CIRCUITS

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to wireless communications and more particularly to a radio used for such wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In most applications, radio transceivers are implemented in one or more integrated circuits (ICs), which are inter-coupled via traces on a printed circuit board (PCB). The radio transceivers operate within licensed or unlicensed frequency spectrums. For example, wireless local area network (WLAN) transceivers communicate data within the unlicensed Industrial, Scientific, and Medical (ISM) frequency spectrum of 900 MHz, 2.4 GHz, 5 GHz and in other frequency bands including 29 GHz, 60 GHz and greater.

For high frequency wireless communications (e.g., in the 29 GHz or greater frequency bands), it is desirous to have a radio transceiver capable of communicating within several frequency bands (e.g., be a multi-mode transceiver). However, at such high frequencies, it is difficult to produce an economical and reliable integrated circuit version of a high frequency multi-mode transceiver.

Therefore, a need exists for a high frequency integrated circuit multi-mode transceiver.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

FIG. 5 is a schematic block diagram of an embodiment of a radio receiver circuit in accordance with the present invention;

FIG. 6 is a schematic block diagram of an embodiment of a radio transmitter circuit in accordance with the present invention;

FIG. 14 is a schematic block diagram of an embodiment of an adjustable resonant circuit in accordance with the present invention;

FIG. 15 is a schematic block diagram of another embodiment of an adjustable resonant circuit in accordance with the present invention;

FIG. 16 is a schematic block diagram of another embodiment of an adjustable resonant circuit in accordance with the present invention;

FIG. 17 is a schematic block diagram of another embodiment of an adjustable resonant circuit in accordance with the present invention;

FIG. 18 is a schematic block diagram of another embodiment of an adjustable resonant circuit in accordance with the present invention; and FIG. 19 is a schematic block diagram of another embodiment of an adjustable resonant circuit in accordance with the present invention.

DETAILED DESCRIPTION OF THE INVENTION

Figure 1:
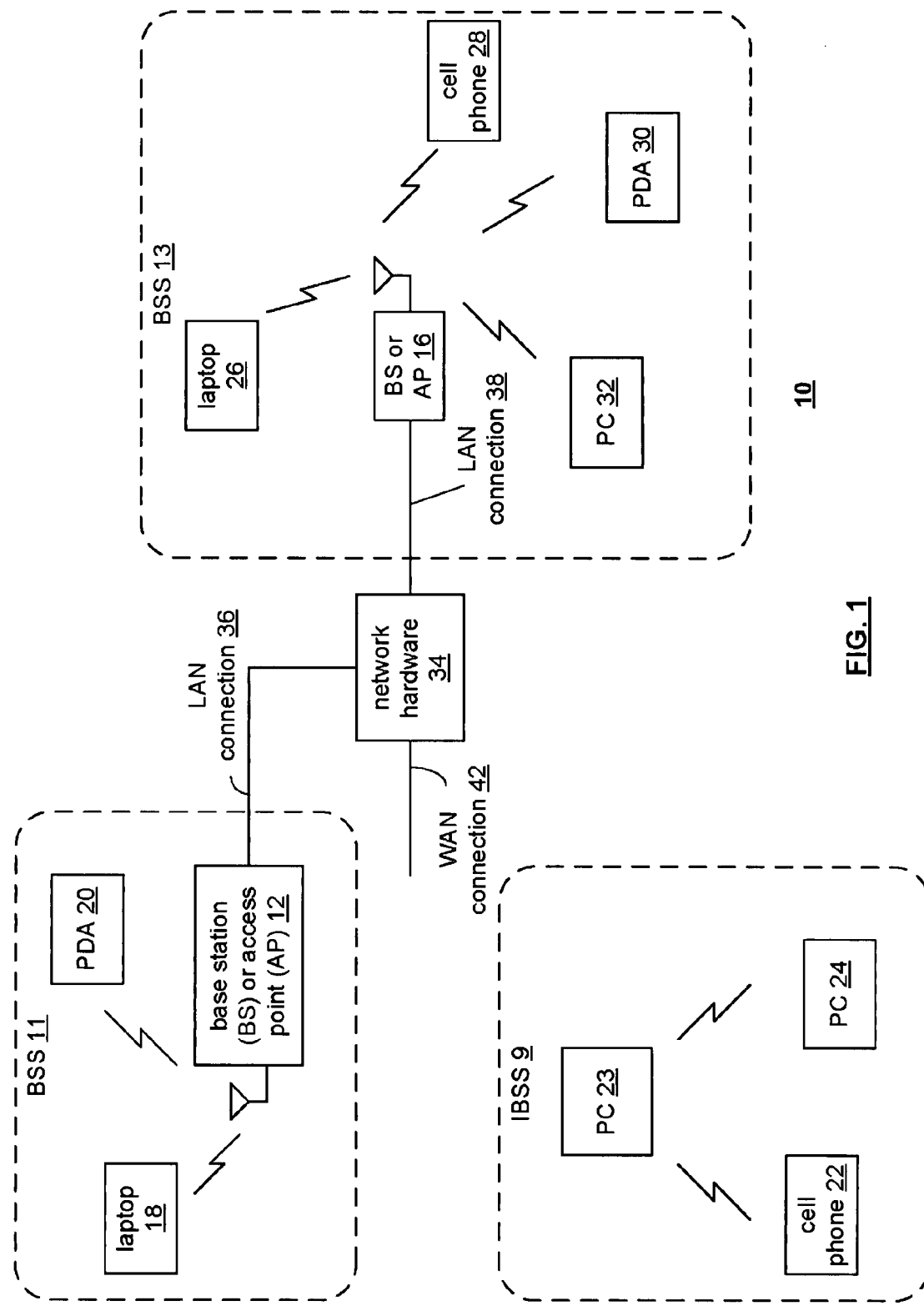
FIG. 1 is a schematic block diagram of an embodiment of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to one or more of FIGS. 2-19.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12-16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Generally, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
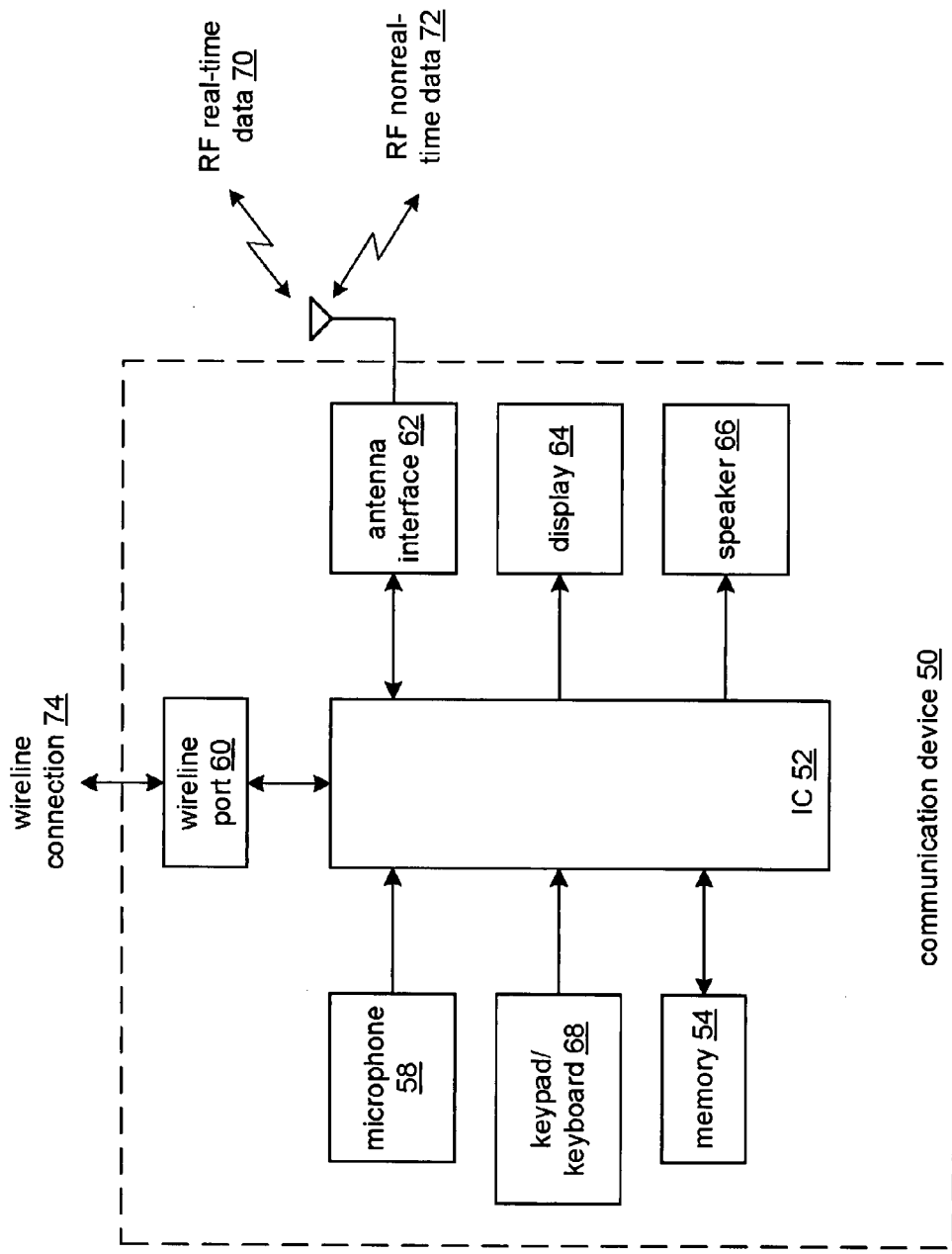
FIG. 2 is a schematic block diagram of an embodiment of a wireless communication device in accordance with the present invention.

FIG. 2 is a schematic block diagram of an embodiment of a wireless communication device 50 that includes an IC (integrated circuit) 52, memory 54, an antenna interface 62, a display 64, a keypad and/or key board 68, at least one microphone 58, at least one speaker 66, and a wireline port 60. The memory 54 may be NAND flash, NOR flash, SDRAM, and/or SRAM for storing data and/or instructions to facilitate communications of real-time and non-real-time data via the wireline port 60 and/or via the antenna interface 62. In addition, or in the alternative, the memory 54 may store video files, audio files, and/or image files for subsequent wireline or wireless transmission, for subsequent display, for file transfer, and/or for subsequent editing. Accordingly, when the communication device 50 supports storing, displaying, transferring, and/or editing of audio, video, and/or image files, the memory would further store user algorithms to support such storing, displaying, and/or editing. For example, the algorithms may include, but are not limited to, file transfer algorithm, video compression algorithm, video decompression algorithm, audio compression algorithm, audio decompression algorithm, image compression algorithm, and/or image decompression algorithm, such as MPEG (motion picture expert group) encoding, MPEG decoding, JPEG (joint picture expert group) encoding, JPEG decoding, MP3 encoding, and MP3 decoding.

For outgoing voice communications, the at least one microphone 58 receives an audible voice signal, amplifies it, and provides the amplified voice signal to the IC 52. The IC 52 processes the amplified voice signal into a digitized voice signal using one or more audio processing schemes (e.g., pulse code modulation, audio compression, etc.). The IC 52 may transmit the digitized voice signal via the wireline port 60 to a wireline real-time device and/or to a wireline non-real-time device (e.g., a personal computer, laptop computer, personal digital assistant, a cellular telephone, a cable set-top box, a satellite set-top box, a game console, a wireless local area network (WLAN) transceiver, a Bluetooth transceiver, a frequency modulation (FM) tuner, a broadcast television tuner, a digital camcorder, and/or any other device that has a wireline and/or wireless interface for conveying real-time data with another device). In addition to, or in the alternative, the IC 52 may transmit the digitized voice signal as RF real-time data to a wireless real-time device (e.g., a base station, an access point, another communication device, etc.), and/or to a wireless non-real-time device via the antenna interface 62s.

For outgoing real-time audio and/or video communications, the IC 52 retrieves an audio and/or video file from the memory. The IC 52 may decompress the retrieved audio and/or video file into digitized streaming audio and/or video. The IC 52 may transmit the digitized streaming audio and/or video via the wireless port 60 to the wireline real-time device and/or to the wireline non-real-time device. In addition to, or in the alternative, the IC 52 may transmit the digitized streaming audio and/or video as RF real-time data 106 to the wireless real-time device, and/or to the wireless non-real-time device via the antenna interface 62. Note that the IC 52 may mix a digitized voice signal with a digitized streaming audio and/or video to produce a mixed digitized signal that may be transmitted via the wireline port 60 and/or via the antenna interface 62.

In a playback mode of the communication device 50, the IC 52 retrieves an audio and/or video file from the memory 54. The IC 52 may decompress the retrieved audio and/or video file into digitized streaming audio and/or video. The IC 52 may convert an audio portion of the digitized streaming audio and/or video into analog audio signals that are provided to the at least one speaker 66. In addition, the IC 52 may convert a video portion of the digitized streaming audio and/or video into analog or digital video signals that are provided to the display 64, which may be a liquid crystal (LCD) display, a plasma display, a digital light project (DLP) display, and/or any other type of portable video display.

For incoming RF voice communications, the antenna interface 62 receives, via an antenna, inbound RF real-time data 70 (e.g., inbound RF voice signals) and provides them to the IC 52. The IC 52 processes the inbound RF voice signals into digitized voice signals. The IC 52 may transmit the digitized voice signals via the wireless port 60 to the wireline real-time device and/or to the wireline non-real-time device. In addition to, or in the alternative, the IC 52 may convert the digitized voice signals into an analog voice signals and provide the analog voice signals to the speaker 66.

The IC 52 may receive digitized voice, audio, &/or video signals from the wireline connection 74 via the wireless port 60 or may receive RF signals via the antenna interface 62, where the IC 52 recovers the digitized voice, audio, &/or video signals from the RF signals. The IC 52 may then compress the received digitized voice, audio, &/or video signals to produce voice, audio, &/or video files and store the files in memory. In the alternative, or in addition to, the IC 52 may convert the digitized voice, audio, &/or video signals into analog voice, audio, &/or video signals and provide them to the speaker 66 and/or to the display 64.

For outgoing non-real-time data communications, the keypad/keyboard 68 (which may be a keypad, keyboard, touch screen, voice activated data input, and/or any other mechanism for inputted data) provides inputted data (e.g., emails, text messages, web browsing commands, etc.) to the IC 52. The IC 52 converts the inputted data into a data symbol stream using one or more data modulation schemes (e.g., QPSK, 8-PSK, etc.). The IC 52 converts the data symbol stream into RF non-real-time data signals 72 that are provided to the antenna interface 62 for subsequent transmission via the antenna. In addition to, or in the alternative, the IC 52 may provide the inputted data to the display 64. As another alternative, the IC 52 may provide the inputted data to the wireline port 60 for transmission to the wireline non-real-time data device and/or the non-real-time device.

For incoming non-real-time communications (e.g., text messaging, image transfer, emails, web browsing), the antenna interface 62 receives, via an antenna, inbound RF non-real-time data signals 72 (e.g., inbound RF data signals) and provides them to the IC 52. The IC 52 processes the inbound RF data signals into data signals. The IC 52 may transmit the data signals via the wireless port 60 to the wireline non-real-time device and/or to the wireline non-real-time device. In addition to, or in the alternative, the IC 52 may convert the data signals into analog data signals and provide the analog data signals to an analog input of the display 64 or the IC 52 may provide the data signals to a digital input of the display 64.

Figure 3:
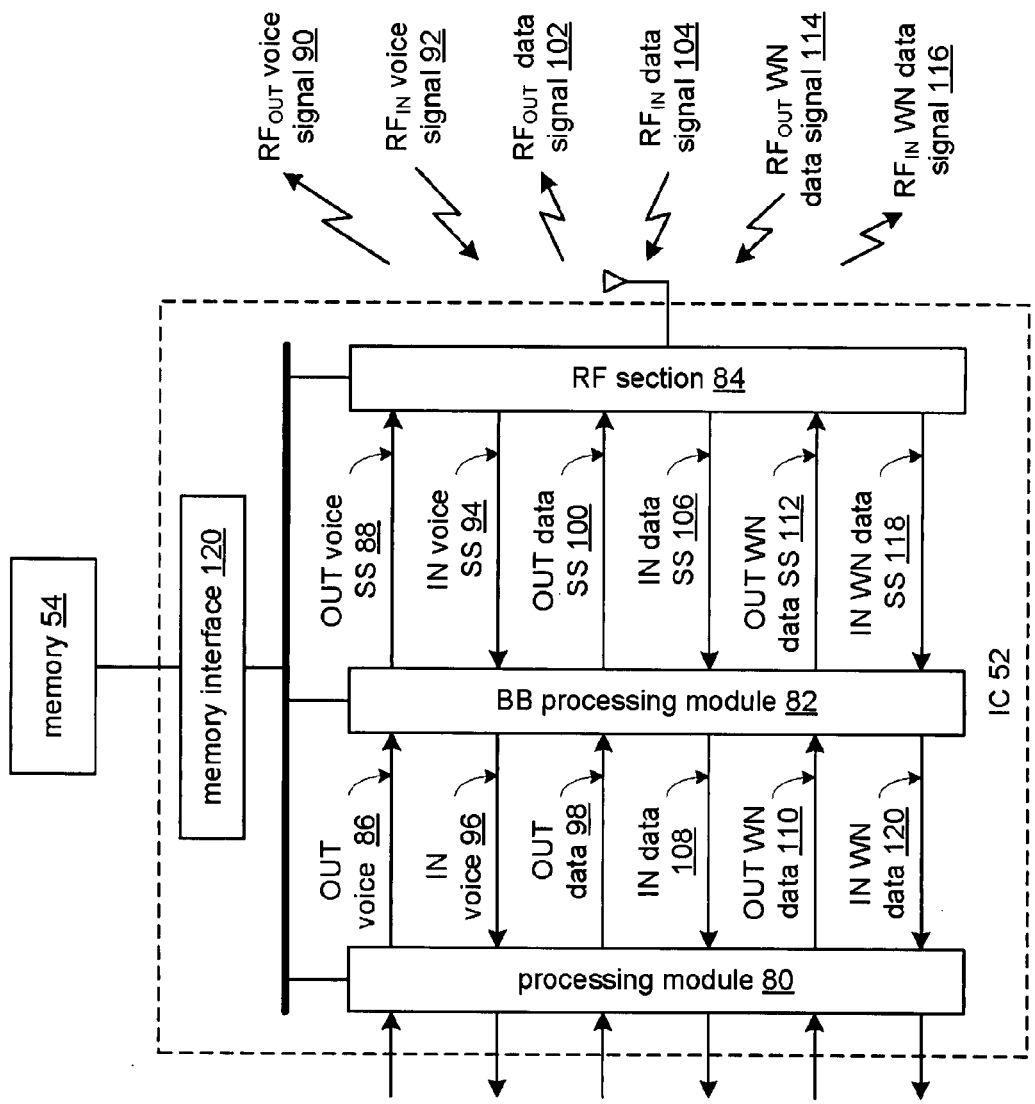
FIG. 3 is a schematic block diagram of an embodiment of a wireless communication device integrated circuit in accordance with the present invention.

FIG. 3 is a schematic block diagram of an embodiment of an integrated circuit (IC) 52 that is coupled to memory 54 via a memory interface 120. The IC 52 includes a processing module 80, a baseband (BB) processing module 82, and a radio frequency (RF) section 84. The processing module 80 and the BB processing module 82 may be separate processing modules and/or shared processing modules, where a processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module(s) may have an associated memory and/or memory element, which may be a single memory device, a plurality of memory devices, and/or embedded circuitry of the processing module(s). Such a memory device may be a read-only memory, random access memory, volatile memory, non-volatile memory, static memory, dynamic memory, flash memory, cache memory, and/or any device that stores digital information. Note that when the processing module(s) implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module(s) executes, hard coded and/or operational instructions corresponding to at least some of the steps and/or functions illustrated in FIG. 3.

In an embodiment, the baseband processing module 82 is coupled to convert an outbound voice physical layer signal 86 into an outbound voice symbol stream 88 and to convert an inbound voice symbol stream 84 into an inbound voice physical layer signal 96 in accordance with a cellular voice protocol (e.g., past, present, or future versions of GSM, AMPS, CDMA, WCDMA, etc.). The processing module 80 processes inbound and outbound voice physical layer signals 86 and 96 in accordance with the upper layers (e.g., medium access control (MAC) layer, network layer, transport layer, session layer, presentation layer, and application layer) of the wireless communication protocol to provide inbound and outbound voice signals.

In another embodiment, the baseband processing module 82 converts outbound physical layer data 98 into an outbound data symbol stream 100 and converts an inbound data symbol stream 106 into inbound physical layer data 108 in accordance with a cellular data protocol (e.g., past, present, or future versions of EDGE, GPRS, HSDPA, HSUPA, etc.). The processing module 80 processes inbound and outbound physical layer data 98 and 108 in accordance with the upper layers (e.g., medium access control (MAC) layer, network layer, transport layer, session layer, presentation layer, and application layer) of the wireless communication protocol to provide inbound and outbound data signals.

In another embodiment, the baseband processing module 82 converts outbound wireless network physical layer data 110 into an outbound wireless network (WN) data symbol stream 112 and converts an inbound wireless network data symbol stream 118 into inbound wireless network physical layer data 120 in accordance with a wireless network protocol (e.g., past, present, or future versions of Bluetooth, IEEE 802.11, ZIGBEE, RFID, a near field communication protocol, and/or a far field communication protocol, etc.). The processing module 80 processes inbound and outbound physical layer WN data 110 and 120 in accordance with the upper layers (e.g., medium access control (MAC) layer, network layer, transport layer, session layer, presentation layer, and application layer) of the wireless communication protocol to provide inbound and outbound WN data signals.

The RF section 84 converts an inbound RF voice signal 90 into the inbound voice symbol stream 88 and converts the outbound voice symbol stream 94 into an outbound RF voice signal 92 in accordance with the cellular voice protocol. The RF section 84 may also convert an inbound RF data signal 104 into the inbound data symbol stream 106 and convert the outbound data symbol stream 100 into an outbound RF data signal 102 in accordance with the cellular data protocol. The RF section 84 may further convert an inbound RF wireless network data signal 116 into the inbound wireless network data symbol stream 118 and convert the outbound wireless network data symbol stream 112 into an outbound RF wireless network data signal 114 in accordance with the wireless network protocol.

In various uses of the IC 52, the processing module 80, the baseband processing module 82, and the RF section 84 may perform one or more of: converting the inbound RF voice signal into an outbound wireless personal area network (WPAN) RF voice signal; converting the inbound RF voice signal into an outbound wireless local area network (WLAN) RF voice signal; converting the inbound RF voice signal into an inbound analog voice signal; converting the inbound RF data signal into an outbound WPAN RF data signal; converting the inbound RF data signal into an outbound WLAN RF data signal; converting the inbound RF data signal into an inbound data display signal; converting an outbound RF WPAN signal into an outbound RF voice signal; and converting an outbound RF WPAN signal into an outbound RF WLAN signal.

While IC 52 has been shown to be a single IC, the processing module 80, the baseband processing module 82, and the RF section 84 may be fabricated on multiple ICs in a variety of combinations. For example, the processing module 80, the baseband processing module 82, and the RF section 84 may on separate ICs; the processing module 80 may be on one IC while the baseband processing module 82 and the RF section 84 are on another IC; and the processing module 80 and the baseband processing module 82 may be on one IC while the RF section 84 is on one or more additional ICs.

In an application of the IC, the RF section 84 is transceiving RF signals 90, 92, 102, 104, 114, and/or 116 with a high frequency band (e.g., 29 GHz or greater). For example, the RF data signals 102 and/or 104 may be transceived within a 60 GHz frequency band (e.g., 56 GHz to 63 GHz). As another example, the RF wireless network signals 114 and/or 116 may be transceived within a frequency range of 60 GHz to 100 GHz.

Figure 4:
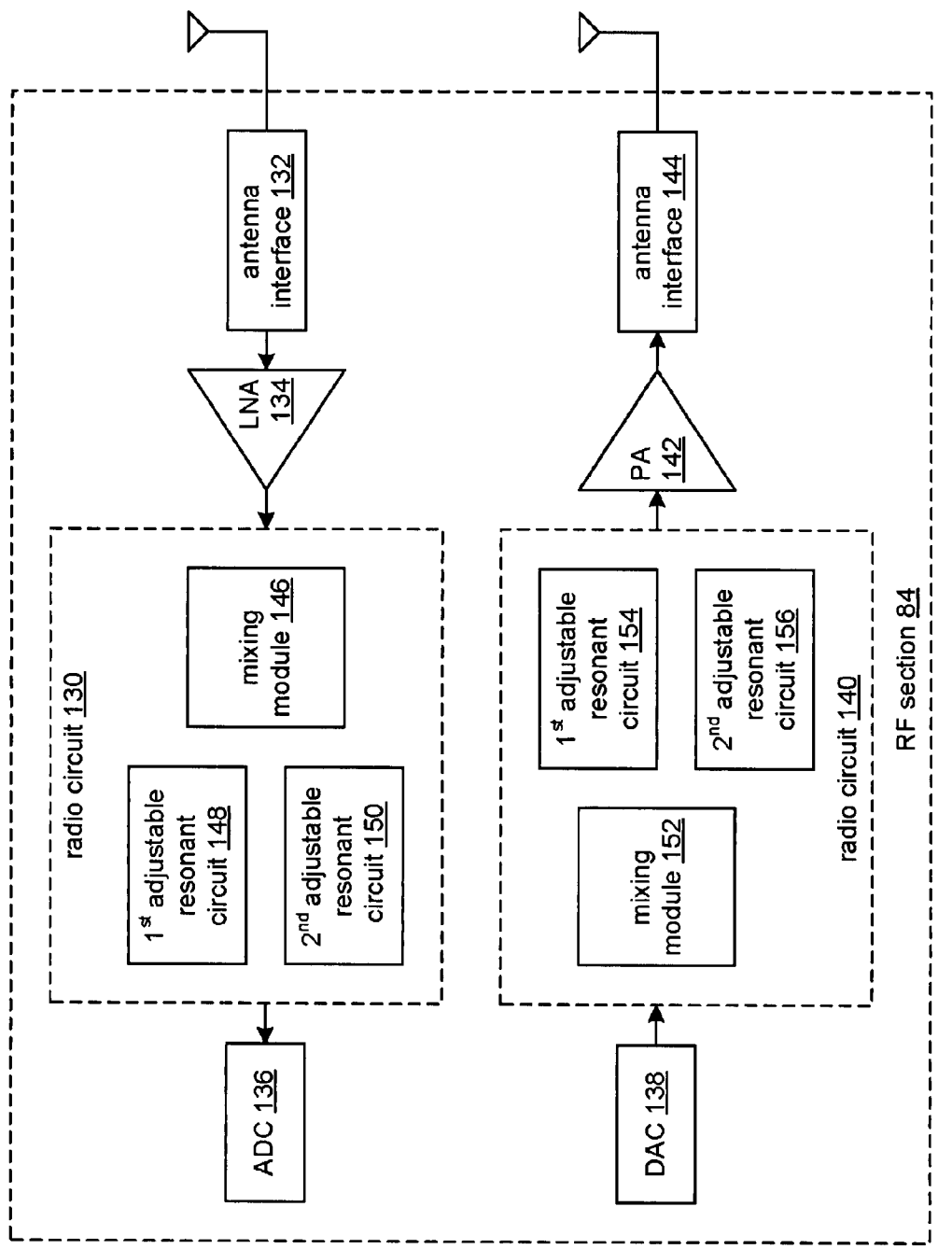
FIG. 4 is a schematic block diagram of an embodiment of an RF section in accordance with the present invention.

FIG. 4 is a schematic block diagram of an embodiment of an RF section 84 that includes a receiver section and a transmitter section. The receiver section includes an antenna interface 132, a low noise amplifier module (LNA) 134, a radio circuit 130, and an analog to digital converter (ADC) 136. The radio circuit 130 includes a mixing module 146, a first adjustable resonant circuit 148, and a second adjustable resonant circuit 150. The transmitter section includes a digital to analog converter (DAC) 138, a radio circuit 140, a power amplifier (PA) module 142, and an antenna interface 144. The radio circuit 140 includes a mixing module 152, a first adjustable resonant circuit 154, and a second adjustable resonant circuit 156.

The receiver section is coupled to receive an inbound RF signal (e.g., signal 92, 104, and/or 116) via one or more antennas and the antenna interface 132. The antenna interface 132, which may include a transformer balun, a transmission line, and/or an impedance matching circuit, provides the received RF signal to the LNA module 134. The LNA module 134, which includes one or more low noise amplifiers coupled in series and/or in parallel, amplifies the received RF signal to produce an amplified RF signal.

The mixing module, 146, which may include one or more passive mixers, active mixers, and/or I/Q mixers, mix the amplified RF signal, which has a first carrier frequency (e.g., in the ISM band, in the 29 GHz band, in the 60 GHz band, or higher frequency bands) with a second signal having a second carrier frequency (e.g., an intermediate frequency local oscillation or a direct conversion local oscillation) to produce a mixed signal having a frequency sum component and a frequency difference component.

Within radio circuit 130, the first adjustable resonant circuit 148 is tuned to provide a notch filter response corresponding to the frequency sum component and the second adjustable resonant circuit 150 is tuned to provide a bandpass filter response corresponding to the frequency difference component. In this manner, the received RF signal is down converted to an intermediate frequency, to baseband, or to near baseband (e.g., a few MHz).

The mixing module 152 of radio circuit 140 mixes an outbound signal, which has a first carrier frequency (e.g., baseband, near baseband, or an intermediate frequency (IF)), with a second signal having a second carrier frequency (e.g., an intermediate frequency local oscillation or a direct conversion local oscillation) to produce a mixed signal having a frequency sum component and a frequency difference component.

With the radio circuit 140, the first adjustable resonant circuit 154 is tuned to provide a notch filter response corresponding to the frequency difference component and the second adjustable resonant circuit 156 is tuned to provide a bandpass filter response corresponding to the frequency sum component. In this manner, the outbound signal is up converted to an intermediate frequency or to the desired RF frequency (e.g., in the ISM band, in the 29 GHz band, in the 60 GHz band, or higher frequency bands).

The power amplifier module 142, which includes one or more power amplifier drivers and/or one or more power amplifiers coupled in series and/or in parallel, amplifies the up converted signal to produce an amplified outbound RF signal. The antenna interface 144, which may include a transformer balun, a transmission line, and/or an impedance matching circuit, provides the amplified outbound RF signal to the antenna for transmission as an outbound RF signal (e.g., outbound RF signal 90, 102, and/or 116).

FIG. 5 is a schematic block diagram of an embodiment of a radio receiver circuit 130 that includes the mixing module 146, the first adjustable resonant circuit 148, and the second adjustable resonant circuit 150. The mixing module 146 includes a passive or active mixer 164. Note that if the mixer 164 is a passive mixer, the mixing module 146 may further include a gain stage to amplify the mixed signal.

As an example, the mixer 164 mixes a first signal 160, which may be represented as $A_1(t)*\cos(\omega_{F1}t+\theta_1(t))$ [where $A_1(t)$ represents amplitude modulation information, $\theta_1(t)$ represent phase modulation information, and F1 represents the carrier frequency] with a second signal 162, which may be represented as $\cos(\omega_{F2}t)$ [where F2 represent the second carrier frequency] to produce a mixed signal 166. The mixed signal 166, which includes a frequency sum component and a frequency difference component, may be expressed as $\frac{1}{2}A_1(t)\cos(\omega_{F1}t+\omega_{F2}t+\theta_1(t))+\frac{1}{2}A_1(t)\cos(\omega_{F1}t-\omega_{F2}t+\theta_1(t))$.

The first adjustable resonant circuit 148 (embodiments of which will be described with reference to FIGS. 14-19) is tuned to provide a notch filter corresponding to the frequency sum component (e.g., F1+F2). As such, the frequency sum component (e.g., $\frac{1}{2}A_1(t)\cos(\omega_{F1}t+\omega_{F2}t+\theta_1(t))$) is substantially attenuated while the frequency difference component (e.g., $\frac{1}{2}A_1(t)\cos(\omega_{F1}t-\omega_{F2}t+\theta_1(t))$) and other frequency components are passed substantially unattenuated.

The second adjustable resonant circuit 150 (embodiments of which will be described with reference to FIGS. 14-19) is tuned to provide a bandpass filter corresponding to the frequency difference component (e.g., F1−F2). As such, the frequency difference component is passed substantially unattenuated while the other frequency components are substantially attenuated to produce the converted signal 168 (e.g., $\frac{1}{2}A_1(t)\cos(\omega_{F1}t-\omega_{F2}t+\theta_1(t))$). Note that F1−F2 may result in a baseband signal, a near baseband signal, or an intermediate frequency signal.

FIG. 6 is a schematic block diagram of an embodiment of a radio transmitter circuit 140 that includes the mixing module 152, the first adjustable resonant circuit 154, and the second adjustable resonant circuit 156. The mixing module 152 includes a passive or active mixer 174. Note that if the mixer 174 is a passive mixer, the mixing module 152 may further include a gain stage to amplify the mixed signal.

As an example, the mixer 174 mixes a first signal 170, which may be represented as $A_1(t)*\cos(\omega_{F1}t+\theta_1(t))$ [where $A_1(t)$ represents amplitude modulation information, $\theta_1(t)$ represent phase modulation information, and F1 represents the carrier frequency, which may be baseband, near baseband, or an intermediate freuqency] with a second signal 172, which may be represented as $\cos(\omega_{F2}t)$ [where F2 represent the second carrier frequency] to produce a mixed signal 176. The mixed signal 176, which includes a frequency sum component and a frequency difference component, may be expressed as $\frac{1}{2}A_1(t)\cos(\omega_{F1}t+\omega_{F2}t+\theta_1(t))+\frac{1}{2}A_1(t)\cos(\omega_{F1}t-\omega_{F2}t+\theta_1(t))$.

The first adjustable resonant circuit 154 (embodiments of which will be described with reference to FIGS. 14-19) is tuned to provide a notch filter corresponding to the frequency difference component (e.g., F1−F2). As such, the frequency difference component (e.g., $\frac{1}{2}A_1(t)\cos(\omega_{F1}t-\omega_{F2}t+\theta_1(t))$) is substantially attenuated while the frequency sum component (e.g., $\frac{1}{2}A_1(t)\cos(\omega_{F1}t+\omega_{F2}t+\theta_1(t))$) and other frequency components are passed substantially unattenuated.

The second adjustable resonant circuit 156 (embodiments of which will be described with reference to FIGS. 14-19) is tuned to provide a bandpass filter corresponding to the frequency sum component (e.g., F1+F2). As such, the frequency sum component is passed substantially unattenuated while the other frequency components are substantially attenuated to produce the converted signal 178 (e.g., $\frac{1}{2}A_1(t)\cos(\omega_{F1}t+\omega_{F2}t+\theta_1(t))$). Note that F1+F2 may result in an intermediate frequency signal or an RF signal.

In the receiver radio circuit of FIG. 5 and the transmitter radio circuit of FIG. 6, the adjustable resonant circuits allow for the receiver or transmitter to operate at different frequencies and/or use different local oscillations (e.g., the second signal). For example, by the resonant frequency of the resonant circuits, the notch filtering characteristics and/or the bandpass filtering characteristics are changed.

Figure 7:
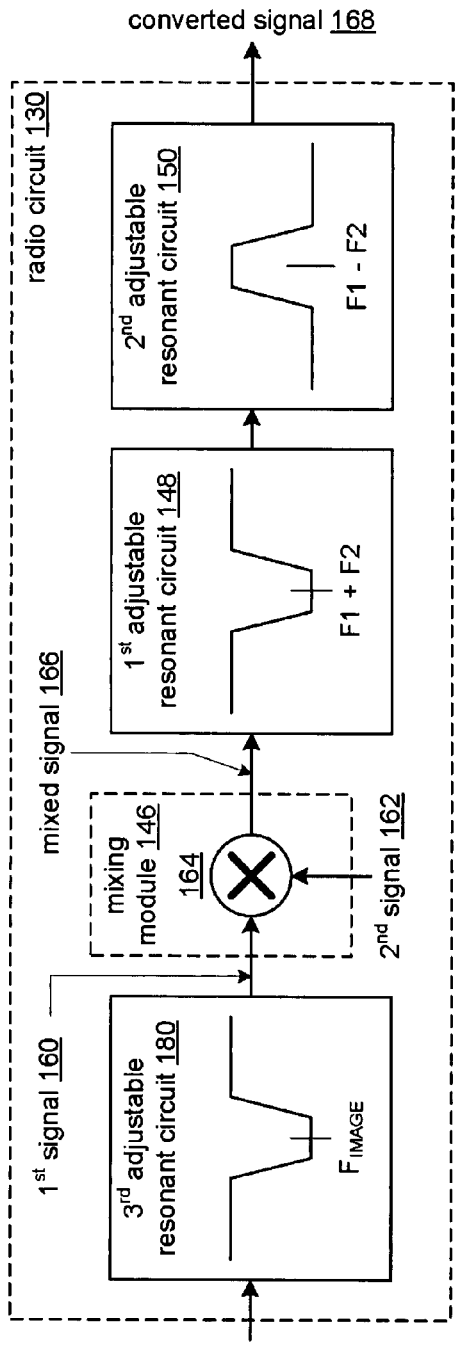
FIG. 7 is a schematic block diagram of another embodiment of a radio receiver circuit in accordance with the present invention.

FIG. 7 is a schematic block diagram of another embodiment of a radio receiver circuit 130 that includes the mixing module 146, the first adjustable resonant circuit 148, the second adjustable resonant circuit 150, and a third adjustable resonant circuit 180. The mixing module 146, the first adjustable resonant circuit 148, and the second adjustable resonant circuit 150 operate as previously discussed with reference to FIG. 5.

In this embodiment, the third adjustable resonant circuit 180 is tuned to provide a notch filter response corresponding to an image frequency (e.g., F2+/−ΔF, where ΔF=F1−F2). The third adjustable resonant circuit 180 filters an inbound signal 182 (e.g., inbound RF signal 92, 104, and/or 116) to produce the first signal 160. In further embodiments, the receiver radio circuit 130 may include one or more additional adjustable resonant circuits to provide notch filters for undesired RF signals, spurs, and/or interferers.

Figure 8:
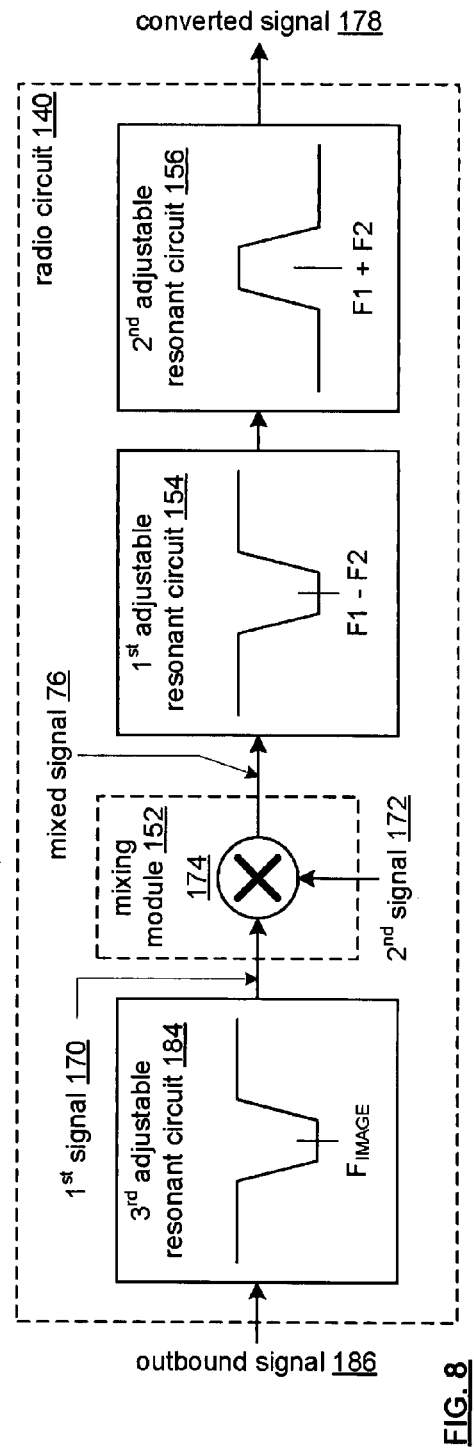
FIG. 8 is a schematic block diagram of another embodiment of a radio transmitter circuit in accordance with the present invention.

FIG. 8 is a schematic block diagram of another embodiment of a radio transmitter circuit 140 that includes the mixing module 152, the first adjustable resonant circuit 154, the second adjustable resonant circuit 156, and a third adjustable resonant circuit 184. The mixing module 152, the first adjustable resonant circuit 154, and the second adjustable resonant circuit 156 operate as previously discussed with reference to FIG. 6.

In this embodiment, the third adjustable resonant circuit 184 is tuned to provide a notch filter response corresponding to the image frequency (e.g., F2+/−ΔF, where ΔF=F1−F2). The third adjustable resonant circuit 184 filters an outbound signal 186 (e.g., outbound signal 86, 98, and/or 110) to produce the first signal 170. In an alternative embodiment, the third adjustable resonant circuit 184 may be tuned to a frequency corresponding to an undesired RF signal, a spur, and/or an interferer. In further embodiments, the transmitter radio circuit 140 may include one or more additional adjustable resonant circuits to provide notch filters for undesired RF signals, spurs, and/or interferers.

Figure 9:
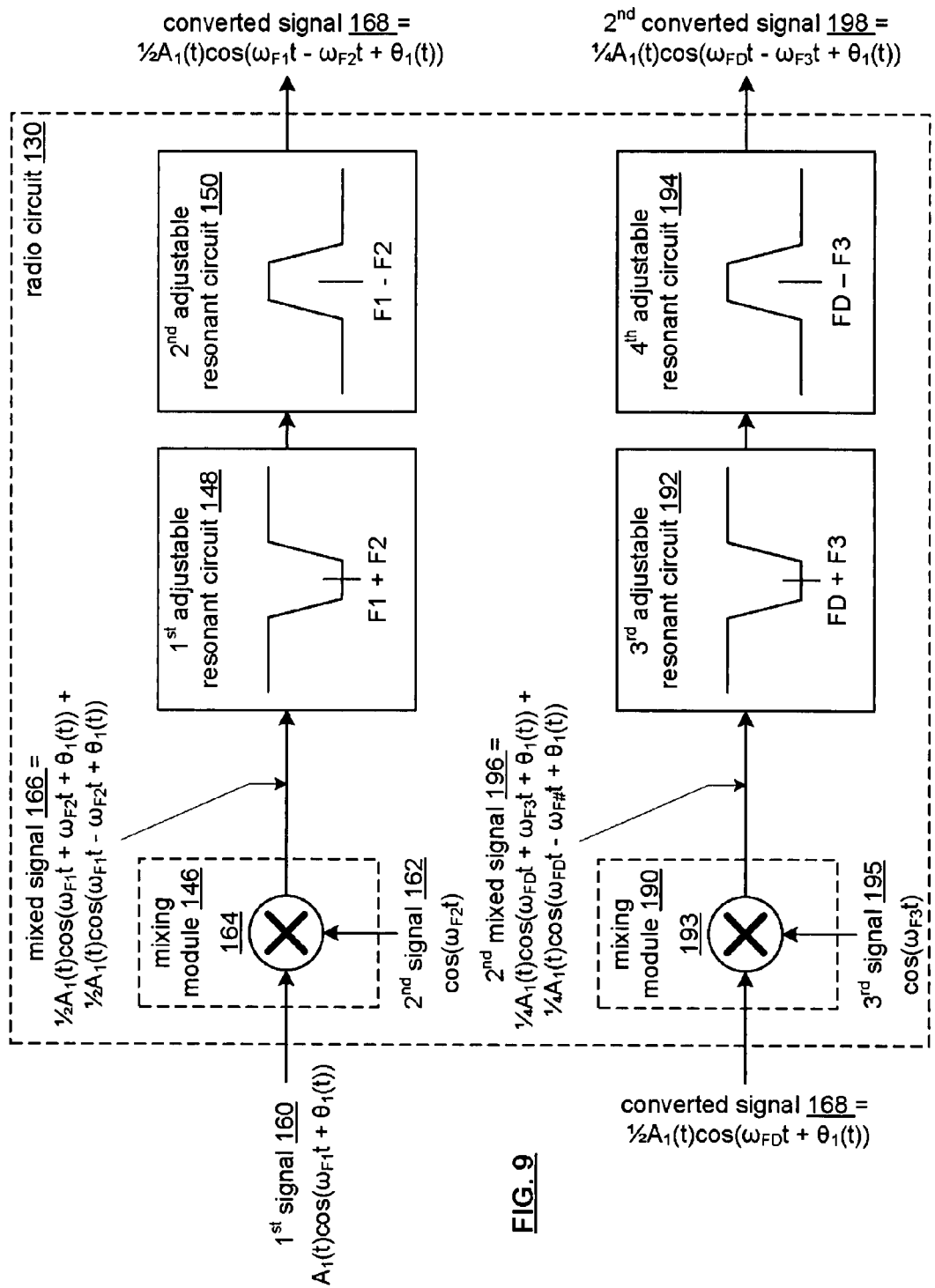
FIG. 9 is a schematic block diagram of another embodiment of a radio receiver circuit in accordance with the present invention.

FIG. 9 is a schematic block diagram of another embodiment of a radio receiver circuit 130 that includes the mixing module 146, the first adjustable resonant circuit 148, the second adjustable resonant circuit 150, a second mixing module 190, a third adjustable resonant circuit 192, and a fourth adjustable resonant circuit 194. Each of the mixing modules 146 and 190 may include a passive or active mixer 164 and 193. Note that if the mixer 164 or 193 is a passive mixer, the mixing module 146 or 190 may further include a gain stage to amplify the mixed signal.

As an example, the mixer 164 mixes a first signal 160, which may be represented as $A_1(t)*\cos(\omega_{F1}t+\theta_1(t))$ [where $A_1(t)$ represents amplitude modulation information, $\theta_1(t)$ represent phase modulation information, and F1 represents the carrier frequency] with a second signal 162, which may be represented as $\cos(\omega_{F2}t)$ [where F2 represent the second carrier frequency] to produce a mixed signal 166. The mixed signal 166, which includes a frequency sum component and a frequency difference component, may be expressed as $\frac{1}{2}A_1(t)\cos(\omega_{F1}t+\omega_{F2}t+\theta_1(t))+\frac{1}{2}A_1(t)\cos(\omega_{F1}t-\omega_{F2}t+\theta_1(t))$.

The first adjustable resonant circuit 148 (embodiments of which will be described with reference to FIGS. 14-19) is tuned to provide a notch filter corresponding to the frequency sum component (e.g., F1+F2). As such, the frequency sum component (e.g., $\frac{1}{2}A_1(t)\cos(\omega_{F1}t+\omega_{F2}t+\theta_1(t))$) is substantially attenuated while the frequency difference component (e.g., $\frac{1}{2}A_1(t)\cos(\omega_{F1}t-\omega_{F2}t+\theta_1(t))$) and other frequency components are passed substantially unattenuated.

The second adjustable resonant circuit 150 (embodiments of which will be described with reference to FIGS. 14-19) is tuned to provide a bandpass filter corresponding to the frequency difference component (e.g., F1−F2). As such, the frequency difference component is passed substantially unattenuated while the other frequency components are substantially attenuated to produce the converted signal 168 (e.g., $\frac{1}{2}A_1(t)\cos(\omega_{F1}t-\omega_{F2}t+\theta_1(t))$). In this embodiment, FD=F1−F2, which corresponds to an intermediate frequency.

The example continues with the mixer 193 mixing the converted signal 168, (e.g., $\frac{1}{2}A_1(t)\cos(\omega_{FD}t+\theta_1(t))$) with a third signal 195, which may be represented as $\cos(\omega_{F3}t)$ [where F3 represent the third carrier frequency] to produce a second mixed signal 196. The second mixed signal 196, which includes a frequency sum component and a frequency difference component, may be expressed as $\frac{1}{4}A_1(t)\cos(\omega_{FD}t+\omega_{F3}t+\theta_1(t))+\frac{1}{4}A_1(t)\cos(\omega_{FD}t-\omega_{F3}t+\theta_1(t))$.

The third adjustable resonant circuit 192 (embodiments of which will be described with reference to FIGS. 14-19) is tuned to provide a notch filter corresponding to the second frequency sum component (e.g., FD+F3). As such, the second frequency sum component (e.g., $\frac{1}{4}A_1(t)\cos(\omega_{FD}t+\omega_{F3}t+\theta_1(t))$) is substantially attenuated while the second frequency difference component (e.g., $\frac{1}{4}A_1(t)\cos(\omega_{FD}t-\omega_{F3}t+\theta_1(t))$) and other frequency components are passed substantially unattenuated.

The fourth adjustable resonant circuit 194 (embodiments of which will be described with reference to FIGS. 14-19) is tuned to provide a bandpass filter corresponding to the second frequency difference component (e.g., FD F3). As such, the second frequency difference component is passed substantially unattenuated while the other frequency components are substantially attenuated to produce the second converted signal 198 (e.g., $\frac{1}{4}A_1(t)\cos(\omega_{FD}t-\omega_{F3}t+\theta_1(t))$). Note that FD−F3 may result in a baseband signal, a near baseband signal, or another intermediate frequency signal.

Figure 10:
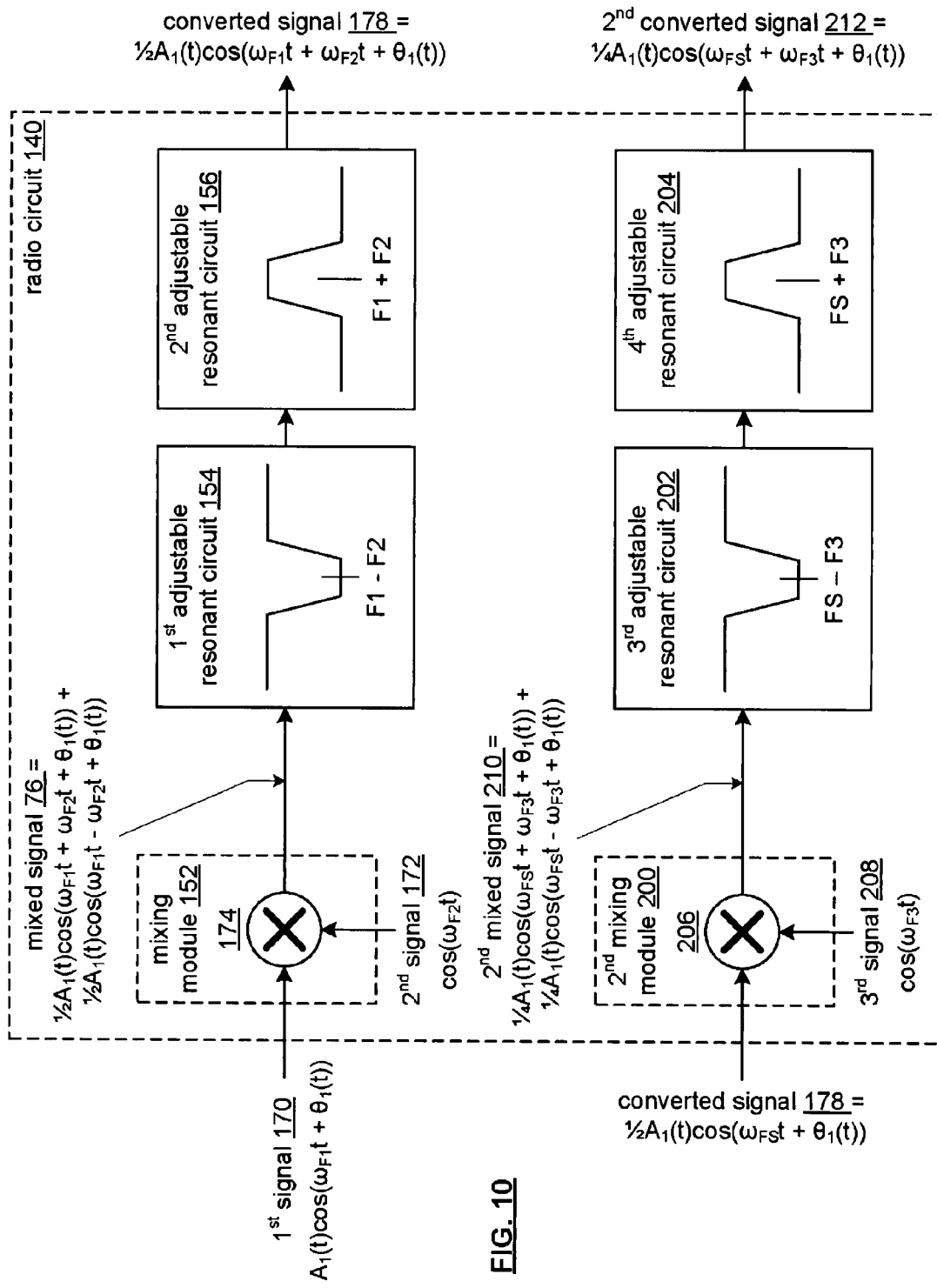
FIG. 10 is a schematic block diagram of another embodiment of a radio transmitter circuit in accordance with the present invention.

FIG. 10 is a schematic block diagram of another embodiment of a radio transmitter circuit 140 that includes the mixing module 152, the first adjustable resonant circuit 154, the second adjustable resonant circuit 156, a second mixing module 200, a third adjustable resonant circuit 202, and a fourth adjustable resonant circuit 204. Each of the mixing modules 152 200 may include a passive or active mixer 174 or 206. Note that if the mixer 174 or 206 is a passive mixer, the mixing module 152 or 200 may further include a gain stage to amplify the mixed signal.

As an example, the mixer 174 mixes a first signal 170, which may be represented as $A_1(t)*\cos(\omega_{F1}t+\theta_1(t))$ with a second signal 172, which may be represented as $\cos(\omega_{F2}t)$ to produce a mixed signal 176. The mixed signal 176, which includes a frequency sum component and a frequency difference component, may be expressed as $\frac{1}{2}A_1(t)\cos(\omega_{F1}t+\omega_{F2}t+\theta_1(t))+\frac{1}{2}A_1(t)\cos(\omega_{F1}t-\omega_{F2}t+\theta_1(t))$.

The first adjustable resonant circuit 154 is tuned to provide a notch filter corresponding to the frequency difference component. As such, the frequency difference component (e.g., $\frac{1}{2}A_1(t)\cos(\omega_{F1}t-\omega_{F2}t+\theta_1(t))$) is substantially attenuated while the frequency sum component (e.g., $\frac{1}{2}A_1(t)\cos(\omega_{F1}t+\omega_{F2}t+\theta_1(t))$) and other frequency components are passed substantially unattenuated.

The second adjustable resonant circuit 156 is tuned to provide a bandpass filter corresponding to the frequency sum component. As such, the frequency sum component is passed substantially unattenuated while the other frequency components are substantially attenuated to produce the converted signal 178 (e.g., $\frac{1}{2}A_1(t)\cos(\omega_{F1}t+\omega_{F2}t+\theta_1(t))$). Note that F1+F2 may result in an intermediate frequency signal or an RF signal.

The example continues with mixer 206 mixing the converted signal 178, which may be represented as $\frac{1}{2}A_1(t)*\cos(\omega_{FS}t+\theta_1(t))$ [where $A_1(t)$ represents amplitude modulation information, $\theta_1(t)$ represent phase modulation information, and FS represents an intermediate frequency] with a third signal 208, which may be represented as $\cos(\omega_{F3}t)$ [where F3 represent the third carrier frequency] to produce a second mixed signal 210. The second mixed signal 210, which includes a second frequency sum component and a second frequency difference component, may be expressed as $\frac{1}{4}A_1(t)\cos(\omega_{FS}t+\omega_{F3}t+\theta_1(t))+\frac{1}{4}A_1(t)\cos(\omega_{FS}t-\omega_{F3}t+\theta_1(t))$.

The third adjustable resonant circuit 202 (embodiments of which will be described with reference to FIGS. 14-19) is tuned to provide a notch filter corresponding to the second frequency difference component (e.g., FS−F3). As such, the second frequency difference component (e.g., $\frac{1}{4}A_1(t)\cos(\omega_{FS}t-\omega_{F3}t+\theta_1(t))$) is substantially attenuated while the second frequency sum component (e.g., $\frac{1}{4}A_1(t)\cos(\omega_{FS}t+\omega_{F3}t+\theta_1(t))$) and other frequency components are passed substantially unattenuated.

The fourth adjustable resonant circuit 204 (embodiments of which will be described with reference to FIGS. 14-19) is tuned to provide a bandpass filter corresponding to the second frequency sum component (e.g., F1+F2). As such, the second frequency sum component is passed substantially unattenuated while the other frequency components are substantially attenuated to produce the second converted signal 212 (e.g., $\frac{1}{4}A_1(t)\cos(\omega_{FS}t+\omega_{F3}t+\theta_1(t))$). Note that FS+F3 may result in an intermediate frequency signal or an RF signal.

Figure 11:
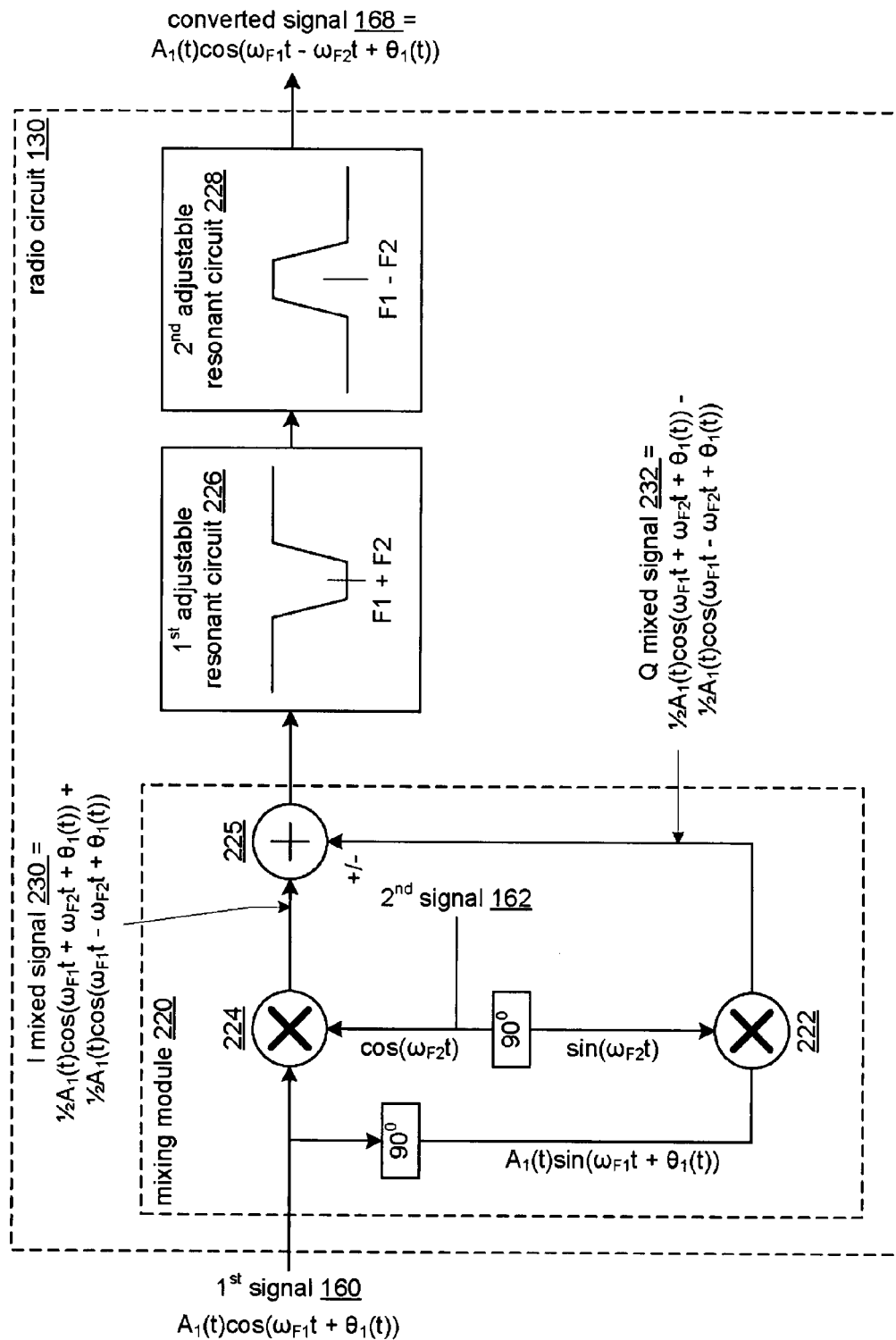
FIG. 11 is a schematic block diagram of another embodiment of a radio receiver circuit in accordance with the present invention.

FIG. 11 is a schematic block diagram of another embodiment of a radio receiver circuit 130 that includes a mixing module 220, a first adjustable resonant circuit 226, and a second adjustable resonant circuit 228. The mixing module 220 includes an in-phase (I) mixer 224, a quadrature (Q) mixer 222, a pair of ninety degree phase shift modules, and a combining module 225.

The mixing module 220 receives a first signal 160 and processes it to produce an in-phase (I) component, which may be expressed as $A_1(t)*\cos(\omega_{F1}t+\theta_1(t))$, and a quadrature (Q) component, which may be expressed as $A_1(t)*\sin(\omega_{F1}t+\theta_1(t))$. The I mixer 224 mixes the I component of the first signal with an I component, which may be expressed as $\cos(\omega F_2 t)$, of a second signal 162 to produce an I mixed signal 230, which may be expressed as $\frac{1}{2}A_1(t)\cos(\omega_{F1}t+\omega_{F2}t+\theta_1(t))+\frac{1}{2}A_1(t)\cos(\theta_{F1}t-\omega_{F2}t+\theta_1(t))$. The Q mixer 222 mixes the Q component of the first signal with an Q component, which may be expressed as $\sin(\omega_{F2}t)$, of the second signal 162 to produce a Q mixed signal 232, which may be expressed as $\frac{1}{2}A_1(t)\cos(\omega_{F1}t+\omega_{F2}t+\theta_1(t))-\frac{1}{2}A_1(t)\cos(\omega_{F1}t-\omega_{F2}t+\theta_1(t))$. The combining module 225 combines (e.g., adds or subtracts depending on whether an upper side band or lower side band is desired) the I and Q mixed signals 230 and 232 to produce an I/Q down converted signal, which may be expresses as $A_1(t)\cos(\omega_{F1}t-\omega_{F2}t+\theta_1(t))$.

The first adjustable resonant circuit 226 (embodiments of which will be described with reference to FIGS. 14-19) is tuned to provide a notch filter corresponding to the frequency sum component (e.g., F1+F2). As such, the frequency sum component (e.g., $A_1(t)\cos(\omega_{F1}t+\omega_{F2}t+\theta_1(t))$) is further attenuated while the frequency difference component (e.g., $A_1(t)\cos(\omega_{F1}t-\omega_{F2}t+\theta_1(t))$) and other frequency components are passed substantially unattenuated.

The second adjustable resonant circuit 228 (embodiments of which will be described with reference to FIGS. 14-19) is tuned to provide a bandpass filter corresponding to the frequency difference component (e.g., F1–F2). As such, the frequency difference component is passed substantially unattenuated while the other frequency components are substantially attenuated to produce the converted signal 168 (e.g., $A_1(t)\cos(\omega_{F1}t-\omega_{F2}t+\theta_1(t))$).

Figure 12:
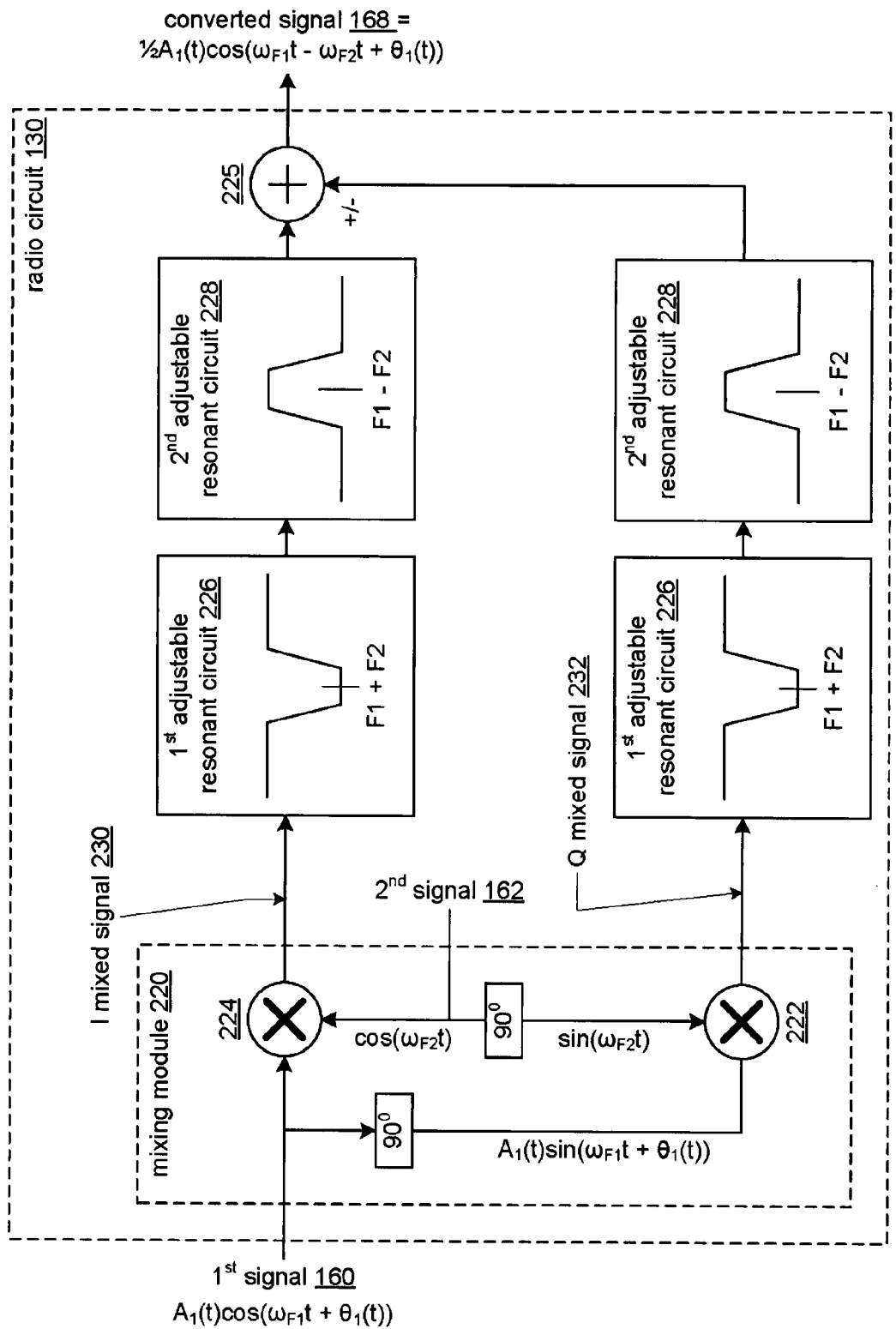
FIG. 12 is a schematic block diagram of another embodiment of a radio receiver circuit in accordance with the present invention.

FIG. 12 is a schematic block diagram of another embodiment of a radio receiver circuit 130 that includes a mixing module 220, a first I adjustable resonant circuit 226, a second I adjustable resonant circuit 228, a first Q adjustable resonant circuit 226, and a second Q adjustable resonant circuit 228. The mixing module 220 includes an in-phase (I) mixer 224, a quadrature (Q) mixer 222, a combining module 225, and a pair of ninety degree phase shift modules.

The mixing module 220 receives a first signal 160 and processes it to produce an in-phase (I) component, which may be expressed as $A_1(t)*\cos(\omega_{F1}t+\theta_1(t))$, and a quadrature (Q) component, which may be expressed as $A_1(t)*\sin(\omega_{F1}t+\theta_1(t))$. The I mixer 224 mixes the I component of the first signal with an I component, which may be expressed as $\cos(\omega_{F2}t)$, of a second signal 162 to produce an I mixed signal 230, which may be expressed as $\frac{1}{2}A_1(t)\cos(\omega_{F1}t+\omega_{F2}t+\theta_1(t))+\frac{1}{2}A_1(t)\cos(\omega_{F1}t-\omega_{F2}t+\theta_1(t))$. The Q mixer 222 mixes the Q component of the first signal with an Q component, which may be expressed as $\sin(\omega_{F2}t)$, of the second signal 162 to produce a Q mixed signal 232, which may be expressed as $\frac{1}{2}A_1(t)\cos(\omega_{F1}t+\omega_{F2}t+\theta_1(t))-\frac{1}{2}A_1(t)\cos(\omega_{F1}t-\omega_{F2}t+\theta_1(t))$.

The first I adjustable resonant circuit 226 is tuned to provide a notch filter corresponding to the frequency sum component (e.g., F1+F2). As such, the frequency sum component (e.g., $\frac{1}{2}A_1(t)\cos(\omega_{F1}t+\omega_{F2}t+\theta_1(t))$) of the I mixed signal is further attenuated while the frequency difference component (e.g., $\frac{1}{2}A_1(t)\cos(\omega_{F1}t-\omega_{F2}t+\theta_1(t))$) of the I mixed signal and other frequency components are passed substantially unattenuated. The second I adjustable resonant circuit 228 is tuned to provide a bandpass filter corresponding to the frequency difference component (e.g., F1–F2).

The first Q adjustable resonant circuit 226 is tuned to provide a notch filter corresponding to the frequency sum component (e.g., F1+F2). As such, the frequency sum component (e.g., $\frac{1}{2}A_1(t)\cos(\omega_{F1}t+\omega_{F2}t+\theta_1(t))$) of the Q mixed signal is further attenuated while the frequency difference component (e.g., $\frac{1}{2}A_1(t)\cos(\omega_{F1}t-\omega_{F2}t+\theta_1(t))$) of the Q mixed signal and other frequency components are passed substantially unattenuated. The second Q adjustable resonant circuit 228 is tuned to provide a bandpass filter corresponding to the frequency difference component (e.g., F1–F2). The outputs of the I and Q adjustable resonant circuits 228 are combined (e.g., added or subtracted depending on whether an upper side band or lower side band is desired) via combining module 225 to produce the converted signal 168 (e.g., $A_1(t)\cos(\omega_{F1}t-\omega_{F2}t+\theta_1(t))$).

Figure 13:
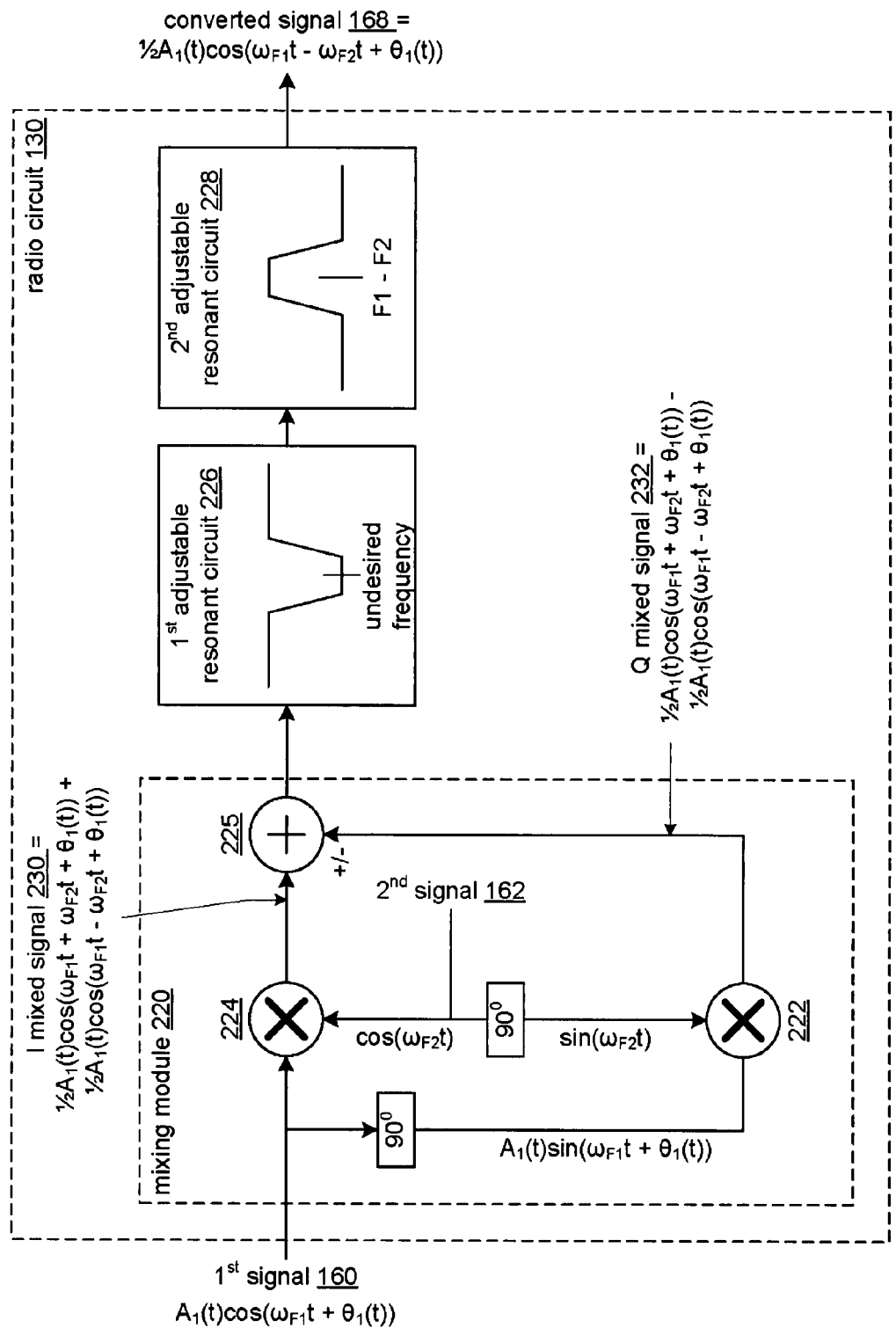
FIG. 13 is a schematic block diagram of another embodiment of a radio receiver circuit in accordance with the present invention.

FIG. 13 is a schematic block diagram of another embodiment of a radio receiver circuit 130 that includes a mixing module 220, a first adjustable resonant circuit 226, and a second adjustable resonant circuit 228. The mixing module 220 includes an in-phase (I) mixer 224, a quadrature (Q) mixer 222, a pair of ninety degree phase shift modules, and a combining module 225.

The mixing module 220 receives a first signal 160 and processes it to produce an in-phase (I) component, which may be expressed as $A_1(t)*\cos(\omega_{F1}t+\theta_1(t))$, and a quadrature (Q) component, which may be expressed as $A_1(t)*\sin(\omega_{F1}t+\theta_1(t))$. The I mixer 224 mixes the I component of the first signal with an I component, which may be expressed as $\cos(\omega_{F2}t)$, of a second signal 162 to produce an I mixed signal 230, which may be expressed as $\frac{1}{2}A_1(t)\cos(\omega_{F1}t+\omega_{F2}t+\theta_1(t))+\frac{1}{2}A_1(t)\cos(\omega_{F1}t-\omega_{F2}t+\theta_1(t))$. The Q mixer 222 mixes the Q component of the first signal with an Q component, which may be expressed as $\sin(\omega_{F2}t)$, of the second signal 162 to produce a Q mixed signal 232, which may be expressed as $\frac{1}{2}A_1(t)\cos(\omega_{F1}t+\omega_{F2}t+\theta_1(t))-\frac{1}{2}A_1(t)\cos(\omega_{F1}t-(\omega_{F2}t+\theta_1(t))$. The combining module 225 combines the I and Q mixed signals 230 and 232 to produce an I/Q down converted signal, which may be expresses as $A_1(t)\cos(\omega_{F1}t-\omega_{F2}t+\theta_1(t))$.

The first adjustable resonant circuit 226 (embodiments of which will be described with reference to FIGS. 14-19) is tuned to provide a notch filter corresponding to one or more of an undesired frequency, an interferer, and/or a frequency spur. As such, the frequency components of the combined signal corresponding to the undesired frequency, the interferer, and/or the frequency spur are further attenuated while the frequency difference component (e.g., $A_1(t)\cos(\omega_{F1}t-\omega_{F2}t+\theta_1(t))$) and other frequency components are passed substantially unattenuated. In an alternative embodiment, the first adjustable resonant circuit 226 may be before the mixers 222 and 224.

The second adjustable resonant circuit 228 (embodiments of which will be described with reference to FIGS. 14-19) is tuned to provide a bandpass filter corresponding to the frequency difference component (e.g., F1–F2). As such, the frequency difference component is passed substantially unattenuated while the other frequency components are substantially attenuated to produce the converted signal 168 (e.g., $A_1(t)\cos(\omega_{F1}t-\omega_{F2}t+\theta_1(t))$).

FIG. 14 is a schematic block diagram of an embodiment of an adjustable resonant circuit 148, 150, 154, 156, 180, 184, 192, 194, 202, 204, 226, and/or 228. In this embodiment, the circuit includes an inductor L and a capacitor C coupled in series to provide a notch filter. The inductor L and/or the capacitor C may be adjustable such that the center frequency of the notch filter response may be tuned to a desired frequency.

FIG. 15 is a schematic block diagram of another embodiment of an adjustable resonant circuit 148, 150, 154, 156, 180, 184, 192, 194, 202, 204, 226, and/or 228. In this embodiment, the circuit includes an inductor L and a capacitor C coupled in parallel to provide a bandpass filter. The inductor L and/or the capacitor C may be adjustable such that the center frequency of the bandpass filter response may be tuned to a desired frequency.

FIG. 16 is a schematic block diagram of another embodiment of an adjustable resonant circuit 148, 150, 154, 156, 180, 184, 192, 194, 202, 204, 226, and/or 228. In this embodiment, the circuit includes an inductor L and a capacitor C coupled in parallel to provide a notch filter. The inductor L and/or the capacitor C may be adjustable such that the center frequency of the notch filter response may be tuned to a desired frequency.

FIG. 17 is a schematic block diagram of another embodiment of an adjustable resonant circuit 148, 150, 154, 156, 180, 184, 192, 194, 202, 204, 226, and/or 228. In this embodiment, the circuit includes an inductor L and a capacitor C coupled in series to provide a bandpass filter. The inductor L and/or the capacitor C may be adjustable such that the center frequency of the bandpass filter response may be tuned to a desired frequency.

FIG. 18 is a schematic block diagram of another embodiment of an adjustable resonant circuit 148, 150, 154, 156, 180, 184, 192, 194, 202, 204, 226, and/or 228. In this embodiment, the circuit includes a transmission line with a plurality of taps 240. By selecting different taps, the bandpass filtering properties of the resonant circuit are changed.

FIG. 19 is a schematic block diagram of another embodiment of an adjustable resonant circuit 148, 150, 154, 156, 180, 184, 192, 194, 202, 204, 226, and/or 228. In this embodiment, the circuit includes one or more quarter wave length microstrip 242. By adjusting the properties of the microstrip to maintain a quarter wave length relationship with the desired frequency, the bandpass filtering properties of the resonant circuit are controlled.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio circuit comprises:
   a mixing module coupled to mix a first signal having a first carrier frequency with a second signal having a second carrier frequency to produce a mixed signal having a frequency sum component and a frequency difference component;
   a first adjustable resonant circuit tuned to provide a notch filter response corresponding to the frequency sum component;
   a second adjustable resonant circuit tuned to provide a bandpass filter response corresponding to the frequency difference component, wherein the first and second adjustable resonant circuits alter the mixed signal to produce a converted signal;
   a second mixing module coupled to mix the converted signal with a third signal having a third carrier frequency to produce a second mixed signal having a second frequency sum component and a second frequency difference component;
   a third adjustable resonant circuit tuned to provide a notch filter response corresponding to the second frequency sum component; and
   a fourth adjustable resonant circuit tuned to provide a band pass filter response corresponding to the second frequency difference component.

2. The radio circuit of claim 1, wherein the mixing module comprises at least one of a passive mixer and an active mixer.

3. The radio circuit of claim 1, wherein the mixing module comprises an in-phase mixer and a quadrature mixer.

4. The radio circuit of claim 1 further comprises:
   a third adjustable resonant circuit tuned to provide a notch filter response corresponding to an undesired frequency or image frequency, wherein the third adjustable resonant circuit filters an inbound signal to provide the first signal having the first carrier frequency.

5. The radio circuit of claim 1, wherein each of the first and second adjustable resonant circuits comprises at least one of:
   an inductor-capacitor circuit;
   a transmission line; and
   a microstrip.

6. A radio circuit comprises:
   a mixing module coupled to mix a first signal having a first carrier frequency with a second signal having a second carrier frequency to produce a mixed signal having a frequency sum component and a frequency difference component;

a first adjustable resonant circuit tuned to provide a notch filter response corresponding to the frequency difference component;
a second adjustable resonant circuit tuned to provide a bandpass filter response corresponding to the frequency sum component, wherein the first and second adjustable resonant circuits alter the mixed signal to produce a converted signal;
a second mixing module coupled to mix the converted signal having a carrier frequency corresponding to frequency of the frequency sum component with a third signal having a third carrier frequency to produce a second mixed signal having a second frequency sum component and a second frequency difference component;
a third adjustable resonant circuit tuned to provide a second notch filter response corresponding to the second frequency difference component; and
a fourth adjustable resonant circuit tuned to provide a bandpass filter response corresponding to the second frequency sum component.

7. The radio circuit of claim 6 further comprises:
a third adjustable resonant circuit tuned to provide a notch filter response corresponding to an undesired frequency or image frequency, wherein the third adjustable resonant circuit filters an outbound signal to provide the first signal having the first carrier frequency.

8. A radio receiver circuit comprises:
a mixing module coupled to mix a first signal having a first carrier frequency with a second signal having a second carrier frequency to produce a mixed signal having a frequency sum component and a frequency difference component;
a first adjustable resonant circuit tuned to provide a notch filter response corresponding to the frequency sum component;
a second adjustable resonant circuit tuned to provide a bandpass filter response corresponding to the frequency difference component;
a second mixing module coupled to mix the converted signal having a carrier frequency corresponding to frequency of the frequency difference component with a third signal having a third carrier frequency to produce a second mixed signal having a second frequency sum component and a second frequency difference component;
a third adjustable resonant circuit tuned to provide a second notch filter response corresponding to the second frequency sum component; and
a fourth adjustable resonant circuit tuned to provide a bandpass filter response corresponding to the second frequency difference component.

9. The radio receiver circuit of claim 8, wherein the mixing module comprises at least one of a passive mixer and an active mixer.

10. The radio receiver circuit of claim 8, wherein the mixing module comprises an in-phase mixer and a quadrature mixer.

11. The radio circuit of claim 8 further comprises:
a third adjustable resonant circuit tuned to provide the notch filter response corresponding to an undesired frequency or a frequency image, wherein the third adjustable resonant circuit filters an inbound signal to provide the first signal having the first carrier frequency.

12. The radio circuit of claim 8, wherein each of the first and second adjustable resonant circuits comprises at least one of:
an inductor-capacitor circuit;
a transmission line; and
a microstrip.

* * * * *